United States Patent [19]

Fisher

[11] 3,906,301
[45] Sept. 16, 1975

[54] COMPUTERIZED LIGHTING SYSTEM
[76] Inventor: Dalziel L. Fisher, 816 N. Battin, Wichita, Kans. 67208
[22] Filed: May 30, 1974
[21] Appl. No.: 474,596

[52] U.S. Cl. .................. 315/97; 321/45 R; 307/261; 307/282; 321/34
[51] Int. Cl.² ......................................... H05B 39/00
[58] Field of Search ............ 321/45 R, 8 R; 315/97; 307/261

[56] References Cited
UNITED STATES PATENTS

| | | | |
|---|---|---|---|
| 3,766,467 | 10/1973 | Reising, Jr. | 321/45 R |
| 3,794,907 | 2/1974 | Fucito | 321/45 R X |

*Primary Examiner*—Nathan Kaufman
*Attorney, Agent, or Firm*—John H. Widdowson

[57] ABSTRACT

An apparatus for converting d.c. current to a.c. current has a multivibrator receiving a direct current operating potential. A differentiator has an amplifier connected to the multivibrator. It produces substantially square wave form output currents. A wave shaper filter is operably connected to the differentiator to shape the wave form into that of a sine wave and a cosine wave respectively. An amplifier is operably connected to the wave shaper filter. The apparatus has a transformer operably connected to the amplifier and to a load. In a preferred specific embodiment the load is a fluorescent lamp, or the like.

7 Claims, 4 Drawing Figures

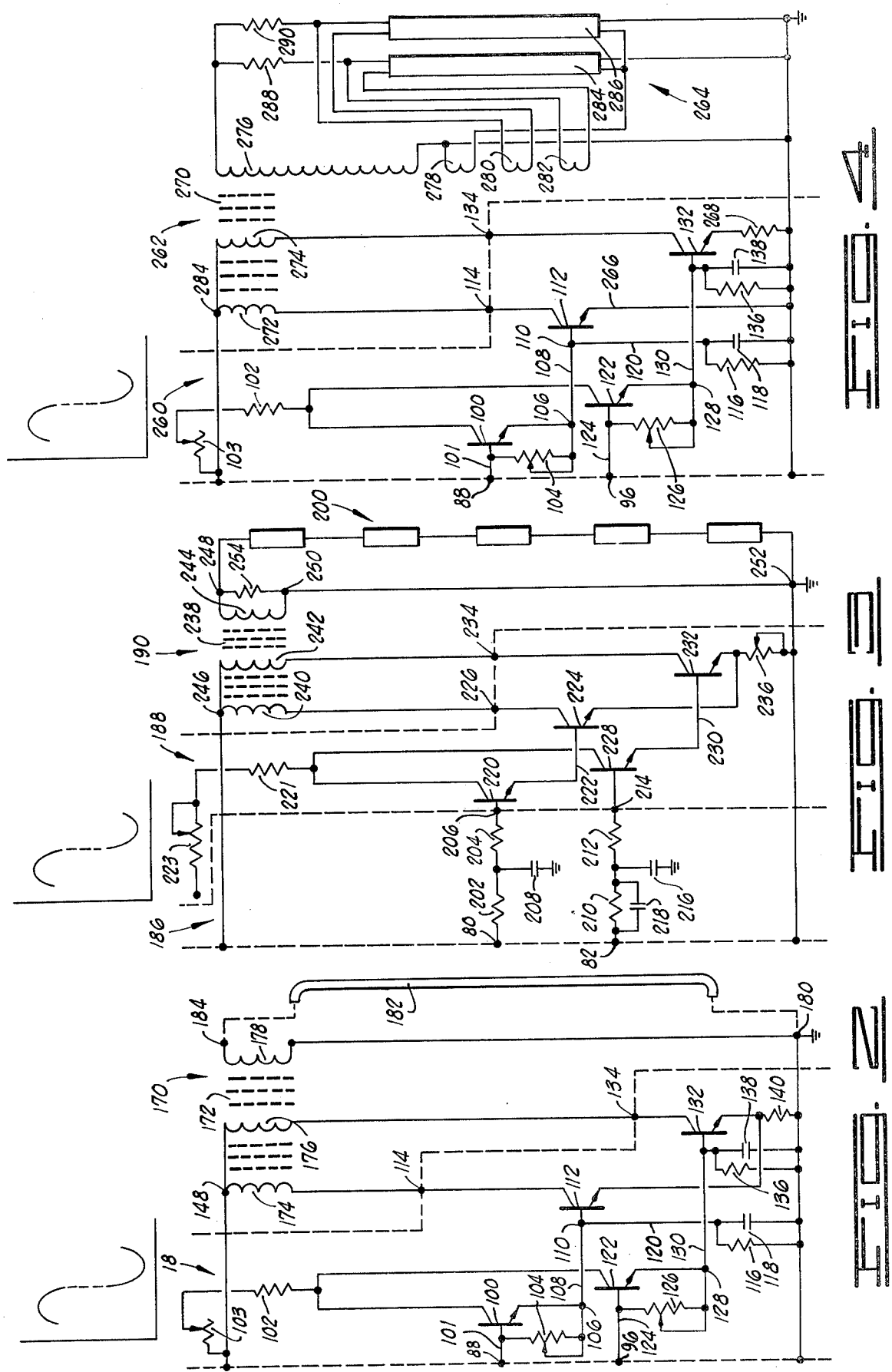

COMPUTERIZED LIGHTING SYSTEM

BACKGROUND OF THE INVENTION

The invention is related to d.c. to a.c. electrical power converters. More particularly, the apparatus is a powering device for a fluorescent lamp which is suitable for use on aircraft where the radio noise or radio interference with equipment aboard the aircraft is of prime concern. More specifically, the apparatus is related to energizing apparatuses for fluorescent lamps, using a free-running multivibrator driven from a direct current power source to produce an alternating current which is amplified, shaped, and further amplified before connection with a push-pull transformer, the output of which is connected with the load which is in this instance the fluorescent lamp.

Numerous types of fluorescent lamp energizing and powering devices are known in the prior art. However, they are not suitable for use with aircraft due to the radio noise interference between the powering device and the radio navigation equipment aboard the aircraft. In recent years it has been necessary to equip aircraft with fluorescent lamps instead of incandescent lamps due to heat and power considerations. However, this presents the problem of radio noise interference between the powering device for the fluorescent lamps and the radio navigation equipment carried on board the aircraft. Specifically, the known prior art powering devices for fluorescent lamps generally have an output of 60 cycles per second, or 400 cycles per second, which induces radio noise in the Automatic Direction Finder (ADF) on board the aircraft which is undesirable and hazardous. The automatic direction finder, or ADF, is a commonly used radio navigation instrument for aircraft which allows the pilot to tune a radio station at a particular point and follow a line from his present position to the radio station. The radio noise interference from the prior art fluorescent lamp powering devices creates a phantom station as well as a substantial quantity of audible noise which can be heard by the pilot in tuning the station. The phantom station created by the radio noise is misleading and will cause the pilot to follow a line from his present position to a phantom point, rather than to the radio station. In regard to specific prior art fluorescent lamp powering devices, they are either powered from a direct current power source where the current must be converted to alternating current before it is connected with the fluorescent lamps, or the powering devices utilize current from an alternating power source on the aircraft, whereupon the frequency and voltage of the current is modified before it is connected with the fluorescent lamps. In the known prior art, d.c. to a.c. converters used to operate fluorescent lamps, the wave form shape, frequency and voltage of the alternating current output are subject to drift and variation in relation to even minor drift or variation in the frequency and voltage of the input power. In other words, these prior art converters do not have an output wave form shape, frequency, and amplitude which is precisely regulated. Precise wave form, frequency, and amplitude control has been found essential for the suppression of radio noise in aircraft navigation instruments. Use of the known prior art fluorescent lamp powering devices and other similar converters for application in aircraft is not practical or safe for the reasons described.

SUMMARY OF THE INVENTION

The computerized lighting system of this invention provides a d.c. to a.c. converter or power supply which is operable from a direct current power source and provides a carefully controlled and precisely regulated output that can be used for operation of fluorescent lamps and which will not produce radio noise or interference in radio navigation equipment aboard aircraft. The lighting system of this invention is generally a computer-like power supply driven from a direct current power source that produces a precisely controlled output in the form of a substantially square wave form in two separate portions, which is shaped into a sine wave portion and a cosine wave portion, then amplified and fed to a push-pull type transformer where it is connected with the load, which is in this case one or more fluorescent lamps. The precisely controlled operating frequency of the computer power supply portion of the apparatus is a frequency which has been determined by analysis and experimentation as being a frequency that will not cause radio noise interference as described above with radio navigation equipment of the type carried aboard aircraft. In a specific embodiment of the apparatus it is shown with the output end thereof constructed to operate a pair of cold cathode type fluorescent lamps. In another specific embodiment of the apparatus, the output end thereof is constructed to power a single cold cathode fluorescent lamp. In another embodiment of the apparatus, the output end thereof is constructed to operate a plurality of cold cathode fluorescent lamps connected in a series relation. In a further embodiment of the apparatus, the output end thereof is constructed to operate a plurality of heated cathode fluorescent lamps.

One object of this invention is to provide a computerized d.c. to a.c. converter which can be used to operate a lighting system for energizing fluorescent lamps overcoming the aforementioned disadvantages of the prior art devices.

Still, one other object of this invention is to provide a computerized lighting system for energizing fluorescent lamps which has a computer power supply providing a precisely controlled alternating current wave form output which is shaped and amplified for use with a push-pull transformer to operate fluorescent lamps with the apparatus operating at a frequency which will not interfere with or cause radio noise interference in aircraft radio navigation equipment of the type normally carried on board aircraft.

Yet, another object of this invention is to provide a computerized electrical power supply or d.c. to a.c. converter having a free-running multivibrator connected with a differentiator that includes a dual operational amplifier producing a substantially square wave form output in two separate portions, having a wave shaper filter operably connected to the differentiator to shape the separate portion of the substantially square wave form into a sine wave form and a cosine wave form, having a push-pull high gain power amplifier operably connected to the wave shaper filter to amplify the wave form; and having a push-pull transformer that is operably connected to the amplifier and to one or more fluorescent lamps.

Various other objects, advantages and features of the invention will become apparent to those skilled in the art from the following discussion, taken in conjunction with the accompanying drawings, in which:

DESCRIPTION OF THE DRAWINGS

FIG. 2 is a schematic circuit diagram of the output end portion of the apparatus of this invention wherein such is constructed to operate a single cold cathode fluorescent lamp;

FIG. 3 is a schematic circuit diagram of the output end portion of the apparatus of this invention wherein such is constructed to operate a plurality of cold cathode fluorescent lamps connected in a series relation; and FIG. 4 is a schematic circuit diagram of the output end portion of the apparatus of this invention wherein such is constructed to operate a plurality of heated cathode type fluorescent lamps.

Figure 1:
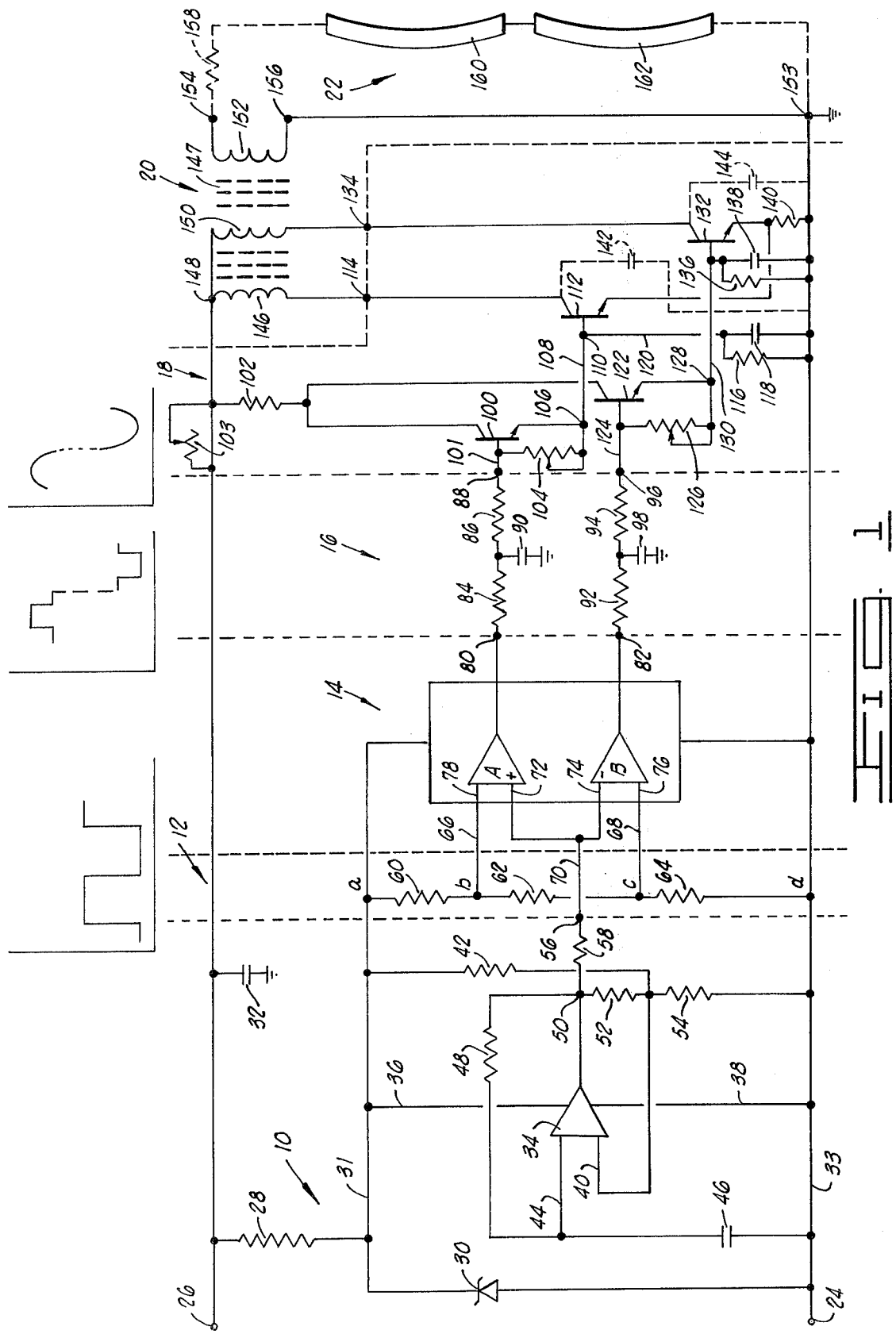
FIG. 1 is a schematic circuit diagram illustrating an embodiment of the computerized converter apparatus of this invention applied to a lighting system with portions of the circuit being divided by dashed lines and having the wave form shape at that particular points in the circuit graphically illustrated adjacent to the circuit.

The following is a discussion and description of preferred specific embodiments of the computerized electrical power converter and lighting system apparatus of this invention, such being made with reference to the drawings, whereupon the reference numerals are used to indicate the same or similar parts and/or structure. It is to be understood that such discussion and description is not to unduly limit the scope of the invention.

DESCRIPTION OF EMBODIMENTS

FIG. 1 shows the complete circuit of an embodiment, (1), of the computerized electrical power converter and lighting system of this invention. The several portions of the circuit are separated by dashed lines for clarity. In general terms, the computerized power converter includes a free-running multivibrator 10 connected to a dual operational amplifier as a differentiator 14, the output of which passes through a wave shaper filter 16 into a push-pull high gain power amplifier 18, and from there to a push-pull type transformer 20 which is connected with the load that is in this instance fluorescent lamps 22. FIGS. 2, 3 and 4 shows modifications in the power converter in the high gain power amplifier portion and the push-pull transformer portion to enable it to operate several different combinations of fluorescent lamps.

Referring again to FIG. 1, the direct current operating potential for this device is applied across terminals 24 and 26. In the power input portion of the circuit, a resistor 28 and a Zener diode 30 are connected across the terminals 24 and 26 to provide a predetermined and certain operating potential for the lower portion of the circuit through line 31 as shown. Preferably the Zener diode 30 is selected to maintain line 31 at 10 volts for a potential across terminals 24 and 26 of approximately 28 volts plus or minus approximately 4 volts. A capacitor 32 is connected to ground as shown from the input at terminal 26 for dampening. Terminal 24 is connected to ground and to line 33. The free-running multivibrator 10 portion of the apparatus is preferably an integrated circuit type operational amplifier connected in the circuit as shown. Positive input to the multivibrator's operational amplifier 34 is through line 36; the negative input is through line 38 from line 33; the non-inverting input is from line 31 through line 40 and resistor 42; and the inverting input is from line 33 through line 44 and capacitor 46. A resistor 48 is connected between the output terminal of the operational amplifier 34 and the juncture of line 44 and capacitor 46. The output terminal of this operational amplifier is indicated at 50, it is connected with a point in line 40 by a resistor 52 and that point is connected by a resistor 54 to line 33 or ground. The multivibrator's output is at terminal 56, which is connected by resistor 58 with the operational amplifier's output terminal 50. The voltage at terminal 56 will preferably vary in substantially a square wave form between a relatively small positive voltage and a larger positive voltage when the multivibrator 10 is operating. In practice, it has been found preferable to operate the multivibrator at approximately 35,000 cycles per second with the voltage varying from approximately 0.2 volts to approximately 9.5 volts for the application of the computerized electrical power converter for an aircraft lighting system as described before.

The three-step voltage divider 12 is interposed in the circuit as shown to provide the operating voltages for the differentiator 14. The three-step voltage divider is comprised of three resistors, 60, 62 and 64, connected in a series relation between the positive and negative voltage supply lines 31 and 33 respectively. The three-step voltage divider 12 is provided with a pair of output voltage supply lines 66 and 68 which supply power for the operational amplifiers of the differentiator 14. Preferably line 66 supplies approximately 6 volts and line 68 approximately 3 volts.

Differentiator 14 is preferably composed of a pair of operational amplifiers in a single integrated circuit type element. Functionally, the differentiator 14 receives the substantially square wave from the free-running multivibrator 10 and functions as a voltage comparator comparing that input with the input from the three-step voltage divider 12 to produce a substantially square wave output from each of the operational amplifiers, with the wave form of one amplifier being positive, and the wave form of the other amplifier being negative. For illustration purposes, the operational amplifiers of the differentiator are labeled "A" and "B." The output terminal 56 of the free-running multivibrator 10 is connected through line 70 to the inverting input 72 of amplifier A and the non-inverting input 74 of amplifier B. The inverting input 76 to amplifier B is connected with the output line 68 from the first step of the voltage divider 12 as shown. The summing input 78 of amplifier A is connected with line 66 from the second step of the voltage divider 12 as shown. The output from operational amplifier A is at terminal 80 and the output from operational amplifier B is at terminal 82. As the voltage in ine 70 moves from its greatest positive value to its least positive value relative to time, amplifier A is first turned on then turned off, which produces a positive and substantially square wave, then amplifier B is turned on, which also produces a positive and substantially square wave. The output from the differentiator 14 is essentially that of a computer in that it is either on or off as is graphically illustrated in FIG. 1 above the circuit. With the points on the circuit labeled $a$, $b$, $c$ and $d$ as reference points and the voltage at terminal 56 being $x$, the output from the differentiator 14 can be described by the following algebraic equation. The equation is one type typically used in circuit analysis. In the equation, the symbol "1" and the symbol "0" indicate the particular amplifier being on or off, as the case may be:

$(x + a +) = (A\ 1 - B\ 0)$
$(x + b +) = (A\ 1 - B\ 0)$
$(x + b -) = (A\ 0 - B\ 0)$
$(x + c +) = (A\ 0 - B\ 0)$
$(x + c -) = (A\ 0 - B\ 1)$
$(x + d -) = (A\ 0 - B\ 1)$

In the above equation, as the voltage, $x$, at terminal 56 swings through a cycle as graphically illustrated, the output of the differentiator is given by the equation and shown as graphically illustrated.

The wave shaper filter 16 is connected with the output terminals 80 and 82 of the differentiator 14. The wave shaper filter 16 is constructed in two portions, one portion to filter the output of the differentiator amplifier A, and the other portion to filter the output of the differentiator amplifier B. In the upper portion of the wave shaper filter 16 as shown is a pair of resistors 84 and 86 connected in series between terminal 80 and another terminal 88 with a capacitor 90 connected to the junction of the resistors 84 and 86 and the ground. In the lower portion of the wave shaper filter 16, as shown, a pair of resistors 92 and 94 are connected in series between terminal 82 and another terminal 96 with a capacitor 98 connected between the juncture of the resistors and ground. Charging and discharging of capacitor 90 filters or shapes the positive and substantially square shape wave form as seen at terminal 80 so that it has a wave form substantially that of a sine wave at point 88. Charging and discharging of capacitor 98 changes the negative and substantially square shape wave form as seen at terminal 82 so that it has a wave form substantially that of a cosine wave at point 96. The resistors 84, 86, 92 and 94 in the wave shaper filter 16 are provided to regulate the voltage or amplitude of the wave form. The shapes of the wave forms at points 88 and 96 are graphically illustrated adjacent to that portion of the circuit.

The push-pull high gain power amplifier 18 is preferably a Darlington configuration amplifier connected with the terminals 88 and 96 of the wave shaper filter 16 to amplify the individual signals present at these terminals. Both portions of the push-pull high gain amplifier 18 are constructed similarly. In the upper portion of the power amplifier 18, the driver transistor 100 has the collector connected by a fixed resistor 102 and a variable resistor 103 to line 31, and the base of the transistor 100 is connected by line 101 to terminal 88. A variable resistor 104 is connected between line 101 and the emitter of transistor 100 at a point indicated at 106. Variable resistor 103 is provided as a power output control for the amplifier 18; in use it reduces the collector current to the driver transistors 100 and 122 or in effect starves them so output of the amplifier 18 is proportionally reduced. With this power converter apparatus used with a lighting system variable resistor 103 functions as a light dimmer. Variable resistors 104 and 126 are provided as the variable type so they can be used to adjust the amplifier 18 to compensate for operating differences in specific components. The emitter of the driver transistor 100 is connected by a line 108 from point 106 to a terminal 110 that is joined to the base of the power transistor 112. The collector of power transistor 112 is connected to one amplifier output terminal 114. A temperature sensitive filter comprised of a grounded and parallelly connected thermister 116 and a capacitor 118 are connected by line 120 with the base of the power transistor 112 at terminal 110. Referring to the lower portion of the amplifier 18, the driver transistor 122 has its collector connected to the resistor 102, its base connected to a line 124 joining it with terminal 96. A variable resistor 126 is connected with the line 124 joining the base of transistor 122 and the emitter of transistor 122 at terminal 128. Terminal 128 is joined by a line 130 to the base of power transistor 132. The collector of the power transistor 132 is connected to the other amplifier output terminal 134. A temperature sensitive filter consisting of a grounded and parallelly connected thermister 136 and a capacitor 138 are connected to the base of the power transistor 132. The emitters of the power transistors 112 and 132 are connected together at a point that is joined to ground through a resistor 140 as shown. In use, the filters having the thermisters 116 and 136 reduce the amplitude of the signal to the power transistors in accordance with operating temperature of the power transistors. As the temperature increases, the resistance of the thermisters decrease to bypass current to the power transistors, and likewise as the temperature decreases, the resistance of the thermisters increase, thereby reducing the current flow through the power transistors. In practice, using the computerized lighting system of this invention, it has been found on occasion necessary to add additional capacitors to the high gain amplifier in the anode output portion thereof, as indicated by the capacitors 142 and 144 shown in dashed lines at FIG. 1. The capacitors 142 and 144 are added only as an option when and if necessary to further reduce the audible noise detectable in certain specific models of radio navigation equipment. The capacitors 142 and 144 are individually connected between the collectors of the power transistors and ground. The capacitors 142 and 144 change the wave form shape at the output of the push-pull high gain power amplifier only slightly, however sufficiently to remove all the audible noise transmitted by the apparatus to the radio navigation equipment, specifically the ADF.

The push-pull transformer 20 as shown in FIG. 1 is constructed with two separate windings in its primary winding portion, a core 147, and a single winding in its secondary winding portion. The transformer's clockwise winding 146 is connected between the amplifier output terminal 114 and a terminal 148 that is joined by a line to power input terminal 26. The counter-clockwise winding 150 is connected between the other amplifier output terminal 134 and to terminal 148. The transformer's secondary winding has a single counter-clockwise wound coil 152, which is connected with the load, in this application, fluorescent lamps 22. The push-pull transformer has output terminals 154 and 156 for the secondary winding 152 which is connected with the load, in this case the fluorescent lamps 22. A load resistor 158 is connected in series with a pair of cold cathode fluorescent lamps 160 and 162 as shown. In practice for this specific embodiment, (1), of the computerized lighting system, the fluorescent lamps 160 and 162 are cold cathode type fluorescent lamps which will operate at approximately 1,000 volts and 3 to 5 amps of current. The cold cathode type fluorescent lamps are one type often used in aircraft cabins because the tube portion of the lamp is curved to fit the generally arcuate-shaped interior cabin structure of an airplane.

In practice, the embodiment, (1), of the computerized lighting system as shown in FIG. 1 has been successfully used in jet aircraft to power the cabin lights. In use and operation of the d.c. to a.c. converter to operate a lighting system as shown in FIG. 1, no significant radio interference was produced in the radio navigation equipment, specifically in the ADF. Specifically, use of the system shown did not under any normal operating conditions produce a phantom station, or anything of the like. With certain specific makes of ADF, it was found necessary to install the capacitors 142 and 144 to eliminate all traces of audible noise from the radio navigation system, so that a station could be tuned on the ADF without any noise in the form of an audible squeak, hum, or the like. The following table (Table I) is a list of representative component values for the apparatus shown in FIG. 1 which in practice have been successfully used and proven to function as described:

TABLE I

| | |
|---|---|
| Potential at Terminals 24, 26 | 28 volts d.c. |
| Resistor 28 | 1,000 ohms, ¼watt |
| Diode 30 | 1N4740 |
| Capacitor 32 | .001 uF |
| Operational Amplifier 34 | LM741 |
| Resistor 42 | 27,000 ohms, ¼watt |
| Capacitor 46 | .01 uF, 1,000 volts |
| Resistor 48 | 3,600 ohms, ¼watt |
| Resistor 52 | 220 ohms, ¼watt |
| Resistor 54 | 8,200 ohms, ¼watt |
| Resistors 58, 60, 62, 64 | 100,000 ohms, ¼watt |
| Differentiator I.C. | N5558 |
| Resistors 84, 92 | 3,000 ohms, ¼watt |
| Resistors 86, 94 | 2,400 ohms, ¼watt |
| Capacitors 90, 98 | .01 uF, 25 volts |
| Transistors 100, 122 | 2N2102 |
| Resistor 103 | 2,000 ohms, 5 watts |
| Resistor 102 | 1,000 ohms, ½watt |
| Resistors 104, 126 | 4,700 ohms, 5 watts |
| Transistors 112, 132 | 2N6121 |
| Thermisters 116, 136 | 125 ohms |
| Capacitors 118, 138 | 1.0 uF |
| Capacitors 142, 144 | .01 uF |
| Transformer Windings 146 | 80 turns CW, 027 AWG |
| Transformer Windings 150 | 80 turns CCW, 027 AWG |
| Transformer Windings 152 | 3,000 turns CCW, 041 AWG |
| Core 3019P | Ferox (TM) |
| Resistor 158 | 10,000 ohms, 5 watts |

Another embodiment, (2), of the apparatus of this invention is constructed to provide a power output slightly different than that of the first described embodiment of the apparatus. In this apparatus, the push-pull transformer portion of the apparatus is different than that shown and described with the first embodiment, (1), of the apparatus. FIG. 2 shows the push-pull high gain amplifier 18 connected with the push-pull transformer 170. The portion of the apparatus circuit, including the multivibrator, the voltage divider, the differentiator, and the wave shaper filter are not included in FIG. 2 to avoid repetition. The portion of the circuit having the push-pull high gain amplifier 18 is included in FIG. 2 for reference, and is provided with the reference numerals shown in FIG. 1 and described therewith. The push-pull transformer 170 has a core 172, a primary winding portion, including a clockwise winding 174 and a counter-clockwise winding 176, and a secondary winding portion having a single counter-clockwise winding 178. Both the windings 174 and 176 in the primary portion of the transformer are connected on one end to terminal 148, and on their other end they are each individually connected to terminals 114 and 134, respectively, the output terminals of the push-pull high gain amplifier 18. Terminal 148 is supplied with the direct current operating potential from terminal 26. The secondary winding 178 is connected to the ground at terminal 180 and to the load, in this case a single cold cathode fluorescent lamp indicated at 182. In order to operate a single cold cathode fluorescent lamp, approximately 1,000 volts at a 3 to 4 amp current is needed at the output of the push-pull transformer, specifically between terminals 184 and 180.

In the preferred construction of the push-pull transformer 170, the primary windings 174 and 176 consist of 80 turns each of a 27 AWG wire and the secondary winding 178 consists of 2,600 turns of 40 AWG wire, with the core of the transformer being 3019P Ferox (TM). With the push-pull transformer 170 constructed as described and with the representative components of Table I, the apparatus has been in practice successfully used and proven to function as described. This embodiment, (2), of the apparatus can provide power to operate a cold cathode fluorescent lamp, and at the same time not produce any substantial objectionable radio noise of the type which would interfere with radio navigation equipment as outlined above.

Another embodiment, (3), of the apparatus of this invention is constructed to provide a power output slightly different than that of the previously described embodiments in order to operate a plurality of two or more cold cathode type fluorescent lights. This embodiment, (3), of the apparatus requires certain modifications to the wave shaper filter, the push-pull high gain amplifier, and the push-pull transformer from that shown and described in conjunction with FIG. 1. In this embodiment, the free-running multivibrator, the voltage divider and the differentiator are the same as that shown in FIG. 1. Therefore, the description and illustration of such are not presented here to avoid duplication. FIG. 3 shows the portion of the apparatus circuit specific to this embodiment which differs from that of the apparatus illustrated in FIG. 1. The wave shaper filter is indicated generally at 186, the push-pull high gain amplifier at 188, and the transformer at 190, with the apparatus shown connected to a plurality of cold cathode lamps in a series relation as indicated at 200. The wave shaper filter 186 is connected with the output terminals 80 and 82 of the differentiator 14. In the upper portion of the wave shaper filter 186, a pair of resistors 202 and 204 are connected in series between terminal 80 and terminal 206 with a capacitor 208 connected between the junction of the resistors and ground. In the lower portion of the wave shaper filter 186, a pair of resistors 210 and 212 are connected in series between terminal 88 and a terminal 214 with a capacitor 216 connected between the junction of the resistors and ground. A second capacitor 218 is connected across resistor 210 to in use function as a noise filter to in use filter noise caused in the circuit due to the timing between the pulses of the separate portions of the differentiator 14. In practice it has been found necessary to place one capacitor in the circuit for this purpose, with such being in the portion of the circuit connected with the operational amplifier B in the differentiator 14. The wave shaper filter 186 functions to change the wave form from the substantially square wave form to substantially that of a sine wave and a cosine wave as graphically illustrated and described above the circuit.

The push-pull high gain amplifier 188 is preferably the Darlington configuration amplifier. In the upper portion of the amplifier 188 as shown, the driver transistor 220 has the collector thereof connected to a resistor 221 and a variable resistor 223, in a series relation with the variable resistor 223 being connected by a line to terminal 26. The base of transistor 220 is connected by a line to terminal 206, and the emitter is connected by a line 222 to the base of the power transistor 224. The collector of the power transistor 224 is connected by a line to one amplifier output terminal indicated at 226. In the lower portion of the amplifier as shown, the collector of the second driver transistor 228 is connected to resistor 221, its base is connected by a line to terminal 214, and its emitter is connected by a line 230 to the base of the second power transistor 232. The collector of the second power transistor 232 is connected by a line to an output terminal of the amplifier indicated at 234. The emitters of the power transistors 224 and 232 are joined by lines to one side of a variable resistor 236, which is in turn connected to ground. The variable resistor 236 functions to adjust the output of the amplifier 188 and to provide compensation for differences in the component operating characteristics. The variable resistor 223 functions as an output power regulator or in this application a light dimmer by regulating anode voltage to the driver transistors.

The push-pull transformer 190 is constructed with two separate windings in its primary portion, and a single winding in its secondary portion, substantially as shown. The push-pull transformer 190 includes a core 238, a clockwise primary winding 240, a counter-clockwise primary winding 242, and in its secondary portion it has a single counter-clockwise winding 244. One side of both primary windings 240 and 242 are connected together at a terminal 246 that is connected by a line with terminal 26, these windings each individually have their other sides respectively connected with the amplifier output terminals 226 and 234, respectively. The secondary winding 224 is provided with terminals 248 and 250 for coupling same with the load. As shown, terminal 250 is connected by a line to ground at terminal 252. A load resistor 254 is connected between terminals 248 and 250. The plurality of cold cathode lamps 200 are connected in a series relation and joined to terminals 248 and 252. In this case, the load seen by the transformer 190 is resistor 254 and the cold cathode fluorescent lamps 200.

The following is a table (Table II) of representative component values for the portion of the apparatus shown in FIG. 2. The apparatus of this embodiment, (3), has been in practice successfully used and proven to function as described with the representative component values listed below and including the portions of this apparatus shown in FIG. 1 and listed in Table I. In practice this apparatus has been found to provide the approximately 2,500 volts which is necessary to operate six cold cathode fluorescent tubes of the size normally used with small jet aircraft.

Table II

| | |
|---|---|
| Resistor 102 | 1,000 ohms, ¼ watt |
| Resistor 103 | 2,000 ohms, 5 watts |
| Resistors 202, 204, 210, 214 | 2,400 ohms |
| Capacitors 208, 216 | .02 uF, 25 volts |

Table II-Continued

| | |
|---|---|
| Capacitor 218 | .0022 uF, 1,000 volts |
| Transistors 220, 228 | 2N2102 |
| Transistors 224, 232 | MJE2801 |
| Resistor 236 | 5 ohms, 12 watts |
| Resistor 254 | 22,000 ohms, 2 watts |
| Transformer Core 238 | FREOM(TM) 4227-3B7 |
| Windings 240 | 67 turns CW, 022 AWG |
| Windings 242 | 67 turns CCW, 022 AWG |
| Windings 244 | 7,000 turns CCW, 041 AWG |

Another embodiment, (4), of the apparatus of this invention is constructed to provide an electrical power output slightly different than that of the previously described embodiments of this invention in order for the apparatus to be used to operate a plurality of heated cathode fluorescent lamps. The circuit of this embodiment of the apparatus uses the free-running multivibrator, voltage divider, differentiator, and wave shaper filter as described in conjunction with the first described embodiment, (1), and includes a push-pull high gain amplifier 260 slightly modified from the amplifier 18 in the first described embodiment, and a push-pull transformer 262 that is constructed with a plurality of secondary windings to operate a plurality of filament heaters in a plurality of hot cathode fluorescent lamps 264. Inasmuch as the first portion of the circuit is substantially the same as that previously described, it is not shown and described here to avoid duplication. FIG. 4 shows the push-pull high gain amplifier, the push-pull transformer and load portions of the circuit for this embodiment, (4), of the apparatus.

In regard to the push-pull high gain amplifier 260, as shown in FIG. 4, it is substantially the same as that shown in FIG. 1, and is provided with the same operating elements, except that the emitters of the power transistors 212 and 232 are connected differently. In FIG. 4 the push-pull high gain amplifier is provided with the same reference numerals on the elements as shown and described in conjunction with FIG. 1. The emitter of power transistor 212 is connected by a line 266 directly to ground, and likewise to emitter of power transistor 232 is connected by a line 268 directly to ground.

The push-pull transformer 262 comprises a core 270; a primary winding having a clockwise winding 272 and a counter-clockwise winding 274; and a secondary winding portion including four counter-clockwise windings indicated at 276, 278, 280, and 282. In the primary portion of the transformer 262, both of the windings 272 and 274 are connected on one end to a terminal 284 that is joined by a line to terminal 26, and they are individually connected to the amplifier output terminals 114 and 134 respectively. In the secondary or output portion of the transformer 262, a winding 276 is substantially larger than the other windings in that portion because it is connected with the cathode portion of the lamps and the other smaller windings are connected with the filament heaters of the lamps. Each of the windings in the secondary portion of the transformer 262 are preferably provided with separate terminal connections. The load, in this case the heated filament fluorescent lamps 262, is connected with the transformer 262 as shown. A pair of lamps 284 and 286 are shown connected in a parallel relation with the cathode portions thereof each having a resistor 288 and 290 respectively and being connected with one side of the transfomer winding 276 as shown. The other end of winding 276 and one side of winding 278 are connected to ground. Windings 280 and 282 are connected to the heaters of the lamps 284 and 286 respectively, as shown. With the apparatus constructed as shown, normal operating cathode voltage for the lamps is approximately 110 volts, and the operating voltage for the heaters is approximately 2.75 volts to 3 volts.

This embodiment of the apparatus has been constructed as illustrated to power a pair of heated cathode fluorescent lamps, and in practice it has been successfully used and proven to function as described. In such practice, the multivibrator, the three-stage voltage divider, the differentiator, and the wave shaper filter have been constructed with the representative component values listed in Table I. The push-pull high grain power amplifier 260 was also constructed with the representative component values for the apparatus shown in FIG. 1 with the power transistors 112 and 132 connected as shown in FIG. 4. The following description of the push-pull transformer 262 and the associated components is representative of the successfully practiced and proven apparatus. The push-pull transformer 262 was constructed with the primary windings 272 and 274 each having 100 turns of 28 AWG wire, the core being a 3119P Ferox (TM); the secondary winding 276 having 900 turns of 36 AWG wire, and the other secondary windings 278, 280 and 282 each having 30 turns of 34 AWG wire. The resistors 288 and 290 are each 3,000 ohms. It is to be understood that the resistors 288 and 290 can be varied, depending upon the specific fluorescent lamp tubes used. The apparatus of this invention constructed as described has been operated with heated cathode fluorescent lamps without producing any substantial objectionable radio noise to interfere with the operation of radio navigation equipment as described above.

In the manufacture of the computerized lighting system apparatus of this invention, it is obvious that same can be constructed to achieve the end product with materials and by practices currently used in electronic equipment manufacture. The apparatus has been constructed and operated in several specific embodiments thereof to power several different specific configurations of fluorescent lamps without causing the heretofore commonly occurring interference with radio navigation equipment aboard aircraft. With the exception of a suitable enclosure for the components, a circuit board and the push-pull transformer, the apparatus is constructed of commonly used and commercially available electronics hardware. It is obvious that a suitable enclosure, a circuit board, and a push-pull transformer can be easily constructed as desired to achieve the end product.

In the use and operation of the computerized lighting system of this invention, it has been seen that in practice it provides a power supply apparatus operable from direct current to power fluorescent lights or provide power for other devices which will not interfere with radio navigation equipment of the type carried aboard aircraft. The apparatus as described and illustrated can be operated from standard aircraft power of 28 volts and as shown can be constructed to operate both cold cathode and heated cathode type fluorescent lamps. In practice, the apparatus has been used in several jet aircraft and exposed to a substantial variation in type and manufacture of radio navigation equipment and has proven to be successful in eliminating the radio noise interference which was present heretofore in prior art devices. Additionally, the apparatus of this invention provides a power supply usable on board an aircraft which is substantially safer than the prior art devices because it does not produce the radio noise or interference inherently present in the prior art devices that has adverse effects on the radio navigation equipment of the aircraft.

As will become apparent from the foregoing description of the applicant's computerized electrical power converter and its application to a lighting system, relatively simple means have been provided to furnish a power supply with a precisely controlled wave form, amplituding and frequency which will not interfere with aircraft radio navigation equipment. The apparatus is relatively economical to manufacture and simple in operation. The apparatus can be used as illustrated here to power fluorescent lamps or it can be used to power substantially any a.c. powered device aboard aircraft, for example, window heaters and de-icing equipment, ventilators, pumps, and servo-controlled equipment.

While the invention has been described in conjunction with preferred specific embodiments thereof, it will be understood that this description is intended to illustrate and not to limit the scope of the invention, which is defined by the following claims:

I claim:

1. An apparatus for converting d.c. current to a.c. current comprising:
   a. a multivibrator, having a pair of input terminals for receiving a direct current operating potential,
   b. a differentiator having a dual operational amplifier, operably connected to said multivibrator, said differentiator having a substantially square wave form output in two separate output currents,
   c. a wave shaper filter operably connected to said differentiator to shape said substantially square wave form currents to have shapes substantially that of a sine wave and a cosine wave, respectively,
   c. an amplifier operably connected to said wave shaper filter, and
   e. a transformer having the primary portion operably connected to said amplifier and the secondary portion operably connected to a load.

2. The apparatus of claim 1, wherein said multivibrator is free running, there is a three-step voltage divider interposed between said free running multivibrator and said differentiator, and said amplifier is a push-pull high gain power one.

3. The apparatus of claim 1, wherein said load is a fluorescent lamp, or the like.

4. The apparatus of claim 2, wherein there is a second wave shaper filter operably connected with said push-pull high gain power amplifier.

5. The apparatus of claim 2, wherein said transformer is a push-pull one, there are a pair of filter capacitors individually connected with the connection between said push-pull high gain power amplifier and said push-pull transformer.

6. The apparatus of claim 2, wherein said push-pull transformer has a clockwise winding and a counter-clockwise winding in its primary portion, and a counter-clockwise winding in its secondary portion.

7. The apparatus of claim 2, wherein:
   a. said push-pull transformer has a counter-clockwise winding and a clockwise winding in said primary portion and a plurality of separate counter-clockwise windings in said secondary portion, and b. a portion of said plurality of windings are operably connected to the heater of a fluorescent lamp or the like and a portion of said plurality of windings are operably connected to the electrodes of same said fluorescent lamp.

* * * * *